US007237931B2

(12) United States Patent
Chen

(10) Patent No.: US 7,237,931 B2
(45) Date of Patent: Jul. 3, 2007

(54) ORIENTATION ADJUSTABLE LAMP

(75) Inventor: Meiric Chen, Taiwan Hsien (TW)

(73) Assignee: Seed Lighting Design Co., Ltd., Hsinchang, Taipei (TW)

( * ) Notice: Subject to any disclaimer, the term of this patent is extended or adjusted under 35 U.S.C. 154(b) by 95 days.

(21) Appl. No.: 11/079,507

(22) Filed: Mar. 14, 2005

(65) Prior Publication Data

US 2006/0203489 A1 Sep. 14, 2006

(51) Int. Cl.
*F21S 8/08* (2006.01)
*F21S 8/00* (2006.01)
*B60Q 1/06* (2006.01)
*F21V 21/10* (2006.01)

(52) U.S. Cl. ...................... 362/427; 362/419; 362/422; 362/428; 362/429

(58) Field of Classification Search ................ 362/413, 362/427
See application file for complete search history.

(56) References Cited

U.S. PATENT DOCUMENTS 1,449,658 A * 3/1923 Deach ..................... 248/124.1
1,895,706 A * 1/1933 Dorris ........................ 403/399
2,299,683 A * 10/1942 Lester ..................... 248/122.1
3,413,459 A * 11/1968 Sonneman .................. 362/401
4,692,850 A * 9/1987 LeDoux ...................... 362/432
4,734,838 A * 3/1988 Pike ........................... 362/427
4,773,621 A * 9/1988 Gebhardt ................. 248/122.1
5,126,928 A * 6/1992 Hughes ...................... 362/287
5,586,820 A * 12/1996 Klink ......................... 362/402
6,439,748 B1 * 8/2002 Hsieh ......................... 362/360
6,854,862 B1 * 2/2005 Hopf .......................... 362/220

* cited by examiner

*Primary Examiner*—John Anthony Ward
*Assistant Examiner*—David Makiya

(57) ABSTRACT

An orientation adjustable lamp comprises a stand rod extended with a supporting frame; a rotation control device positioned to the stand rod; an arm having one end connected to the rotation control device and another end connected to a lamp. The rotation control device includes a seat, a rotation portion, a locking unit and a handle. The seat has an axial hole. The rotation portion is installed at one side of the seat. The rotation portion has a locking stud corresponding to the axial hole of the seat. One end of the locking stud is a threaded section. The rotation portion is installed with a threaded hole for locking the locking unit and a via hole which radially passes through the threaded section. The handle is installed at another side of the seat; the handle having a threaded hole for locking the locking stud and the threaded section.

6 Claims, 8 Drawing Sheets

ORIENTATION ADJUSTABLE LAMP

FIELD OF THE INVENTION

The present invention relates to lamps, and in particular to an orientation adjustable lamp, wherein the stand rod of the lamp is installed with a rotation control device which is assembled to an arm so as to change the orientation of the lamp to provide preferred effect. The present invention is compact and has a beautiful outlook. Furthermore, the present invention can be used to different lamps, such as desk lamps or wall lamps, etc.

BACKGROUND OF THE INVENTION

The prior art floor lamp or desk lamp is formed by a seat, a stand rod and a lamp body. The stand rod is firmly secured to the seat. The lamp body is installed at another end of the lamp body. The prior art lamp has a predetermined projection coverage which is unadjustable. However in the improvement design, the stand rod is rotatable with respect to the seat or the stand rod has a bendable structure so as to adjust the orientation of the lamp. However all these prior art are inconvenient in operation and the extent for changing the orientation is insufficient so that the lamp can not be adjusted to a desired position.

SUMMARY OF THE INVENTION

Accordingly, the primary object of the present invention is to provide an orientation adjustable lamp, wherein the stand rod of the lamp is installed with a rotation control device which is assembled to an arm so as to change the orientation of the lamp to provide preferred effect. The present invention is compact and has a beautiful outlook. Furthermore, the present invention can be used to different lamps, such as desk lamps or wall lamps, etc.

To achieve above objects, the present invention provides an orientation adjustable lamp which comprises a stand rod extended with a supporting frame; a rotation control device positioned to the stand rod; an arm having one end connected to the rotation control device and another end connected to a lamp. The rotation control device includes a seat, a rotation portion, a locking unit and a handle. The seat has an axial hole. The rotation portion is installed at one side of the seat. One end of the rotation portion has a locking stud corresponding to the axial hole of the seat. One end of the locking stud is a threaded section. Another end of the rotation portion is installed with a threaded hole for locking the locking unit and a via hole which radially passes through the threaded section for receiving the arm. The handle is installed at another side of the seat; the handle having a threaded hole for locking the locking stud and the threaded section.

The various objects and advantages of the present invention will be more readily understood from the following detailed description when read in conjunction with the appended drawing.

DETAILED DESCRIPTION OF THE INVENTION

Figure 1:
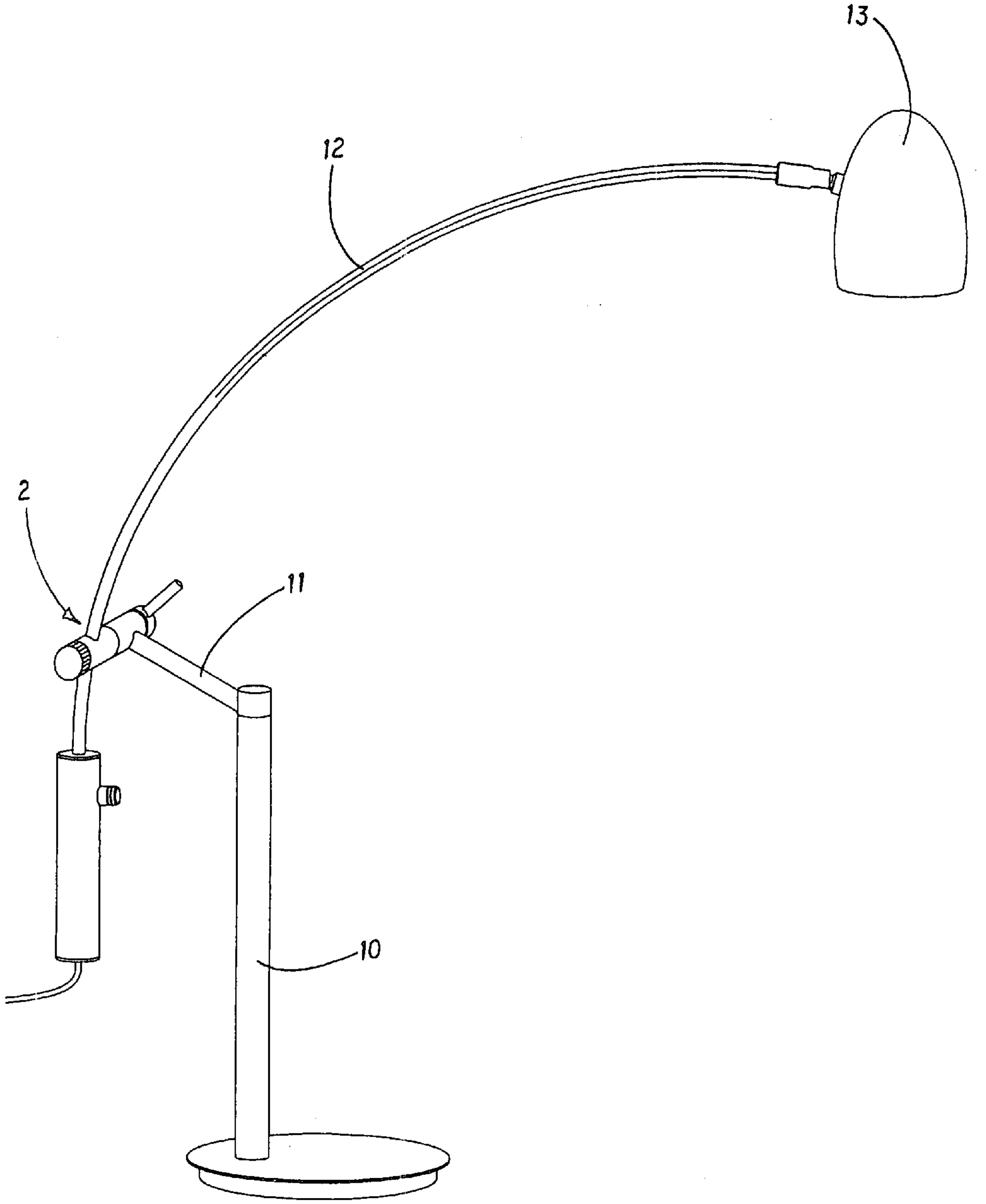
FIG. 1 is a perspective view showing that the rotation control device of the present invention is assembled to a lamp.

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

With reference to FIGS. 1 to 4, an orientation controlled lamp of the present invention is illustrated. The elements of the present invention will be described herein.

A stand rod 10 is extended with a supporting frame 11.

A rotation control device 2 is combined with the supporting frame 11 so as to be positioned to the stand rod 10.

An arm 12 has one end connected to the rotation control device 2 and another end connected to a lamp 13.

The rotation control device 2 includes a seat 21, a rotation portion 22, a locking unit 23 and a handle 24. The seat 21 is fixed to the supporting frame 11 and then is positioned to the stand rod 10. The seat 21 has an axial hole 211. The rotation portion 22 is installed at one side of the seat 21. One end of the rotation portion 22 has a locking stud 221 corresponding to the axial hole 211 of the seat 21. One end of the locking stud 221 is a threaded section 222. A washer 223 is coupled to the end of the locking stud 221. Another end of the rotation portion 22 is installed with a threaded hole 224 for locking the locking unit 23 and a via hole 225 which radially passes through the threaded section 222 for receiving the arm 12. A front end of the locking unit 23 has a plug 231 which is received in the threaded hole 224. The locking unit 23 is screwed into the threaded hole 224 of the rotation portion 22. A front end of the locking stud 221 pushes the plug 231 to resist against a lateral side of the plug 231. The handle 24 is installed at another side of the seat 21. The handle 24 has a threaded hole 242 for locking the locking stud 221 and the threaded section 222.

Figure 5:
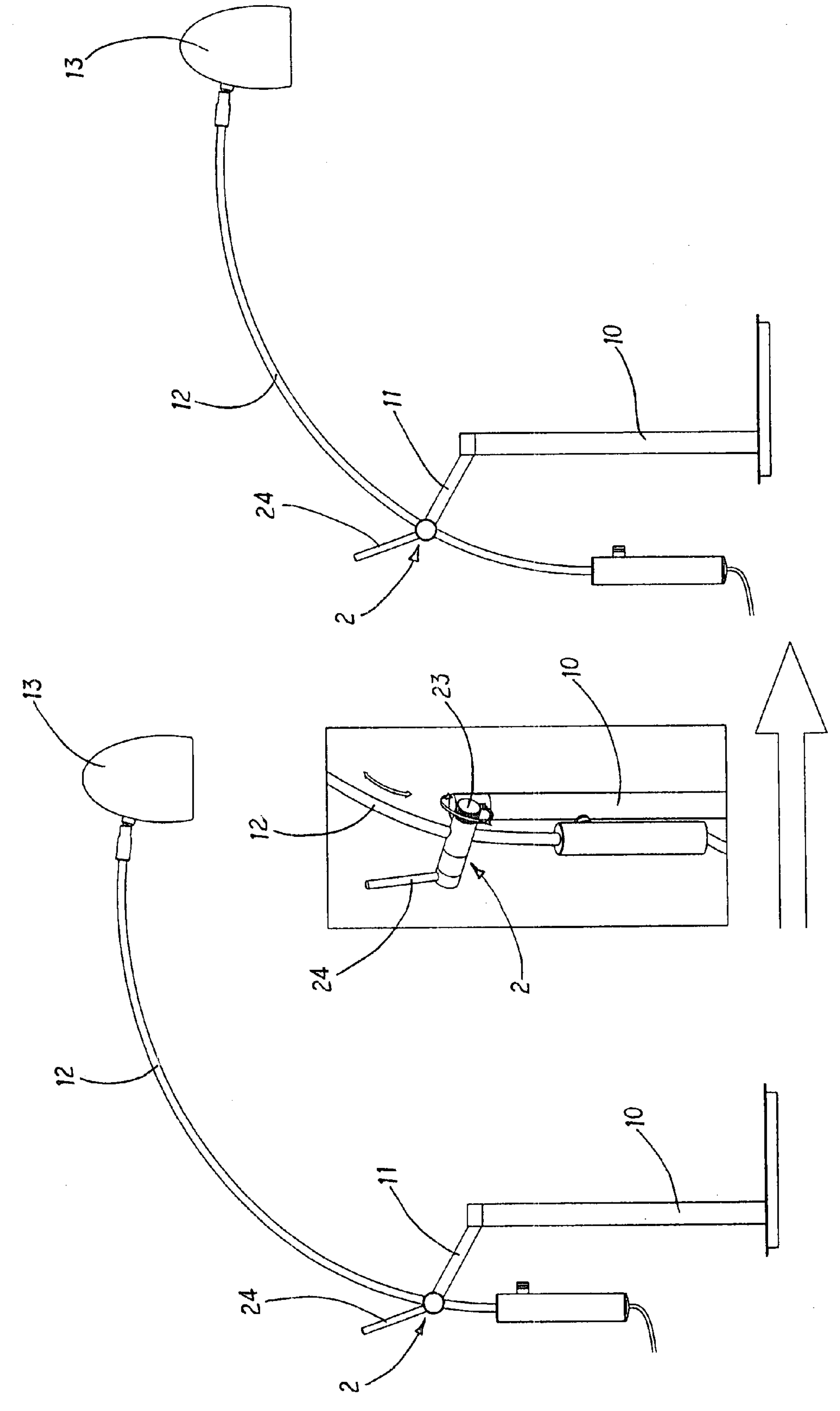
FIGS. 5 and 6 shows the operation of the present invention.
Figure 6:
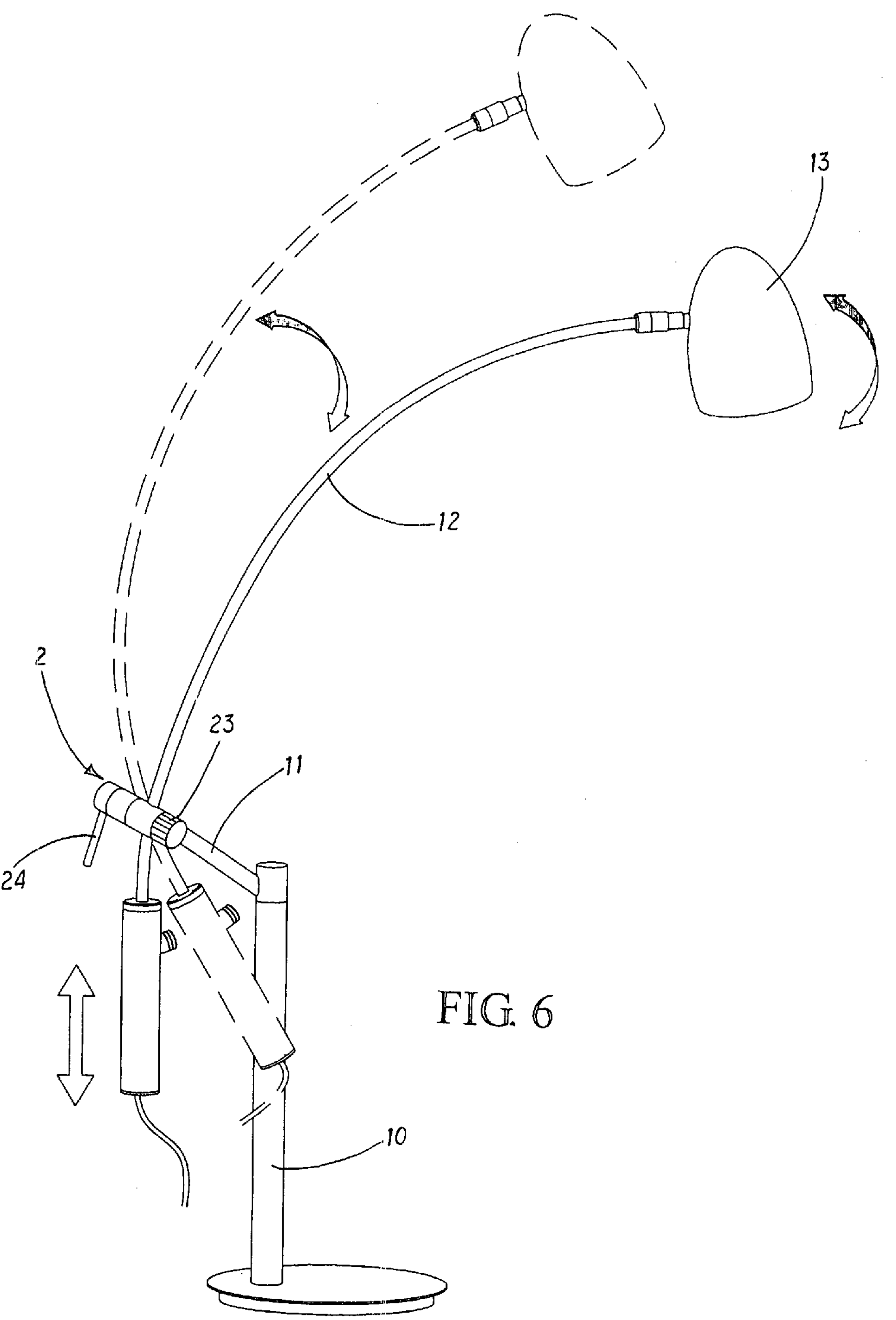

By above mentioned components, the arm 12 is movable in the rotation portion 22 and the via hole 225 and the locking unit 23 can push the plug 231 to resist against the arm 12 to be positioned so as to adjust the suspending position of the lamp (referring to FIG. 5). Furthermore, when the handle 24 is released (referring to FIG. 6), the rotation portion 22 is rotatable with respect to the seat 21 so as to adjust the rotation extent of the arm 12 to a desired level. Then the handle 24 is tightened and positioned so as to provide a preferred illumination coverage and the user can use the lamp easily.

Figure 2:
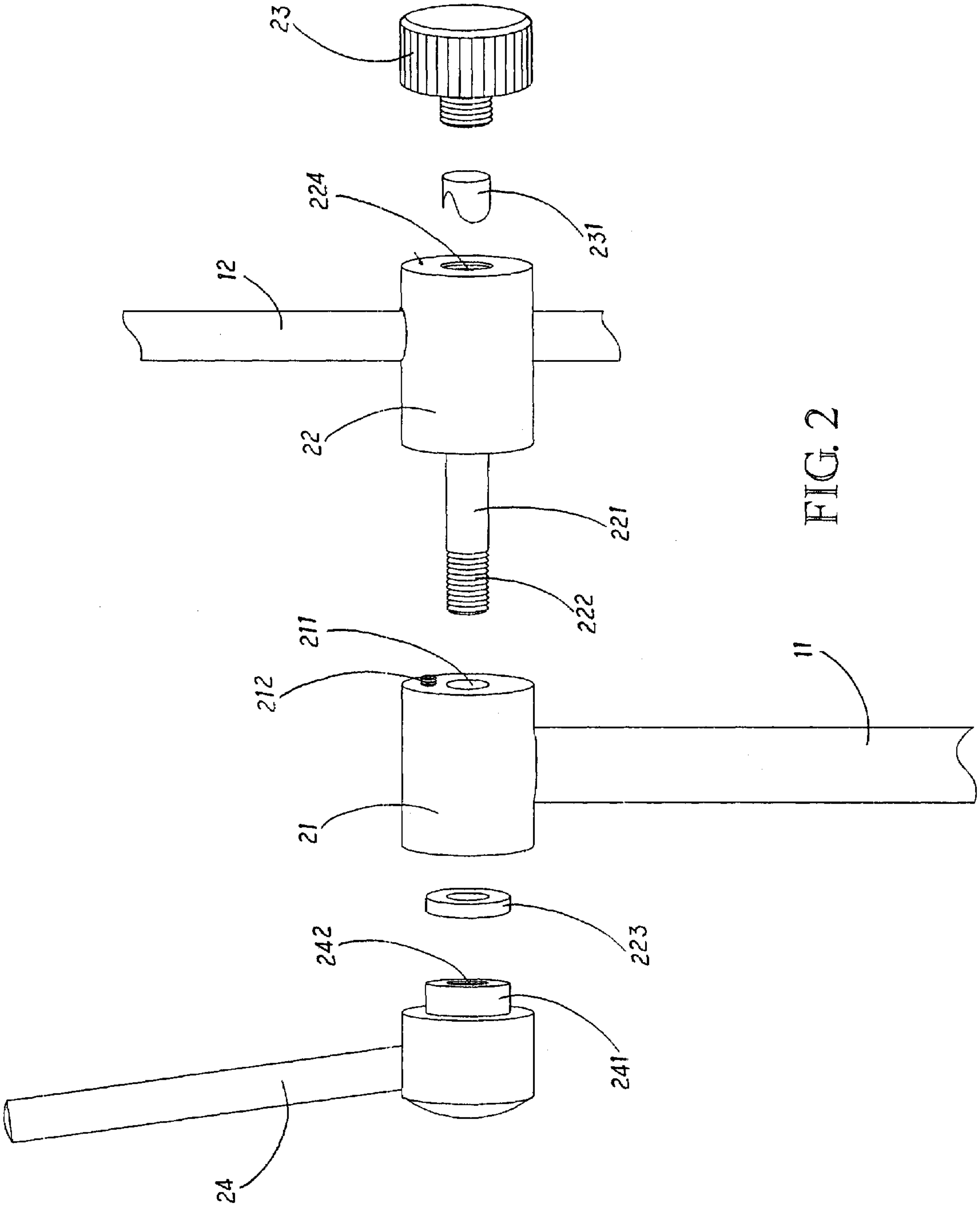
FIG. 2 is an exploded perspective view of the rotation control device of the present invention.
Figure 2A:
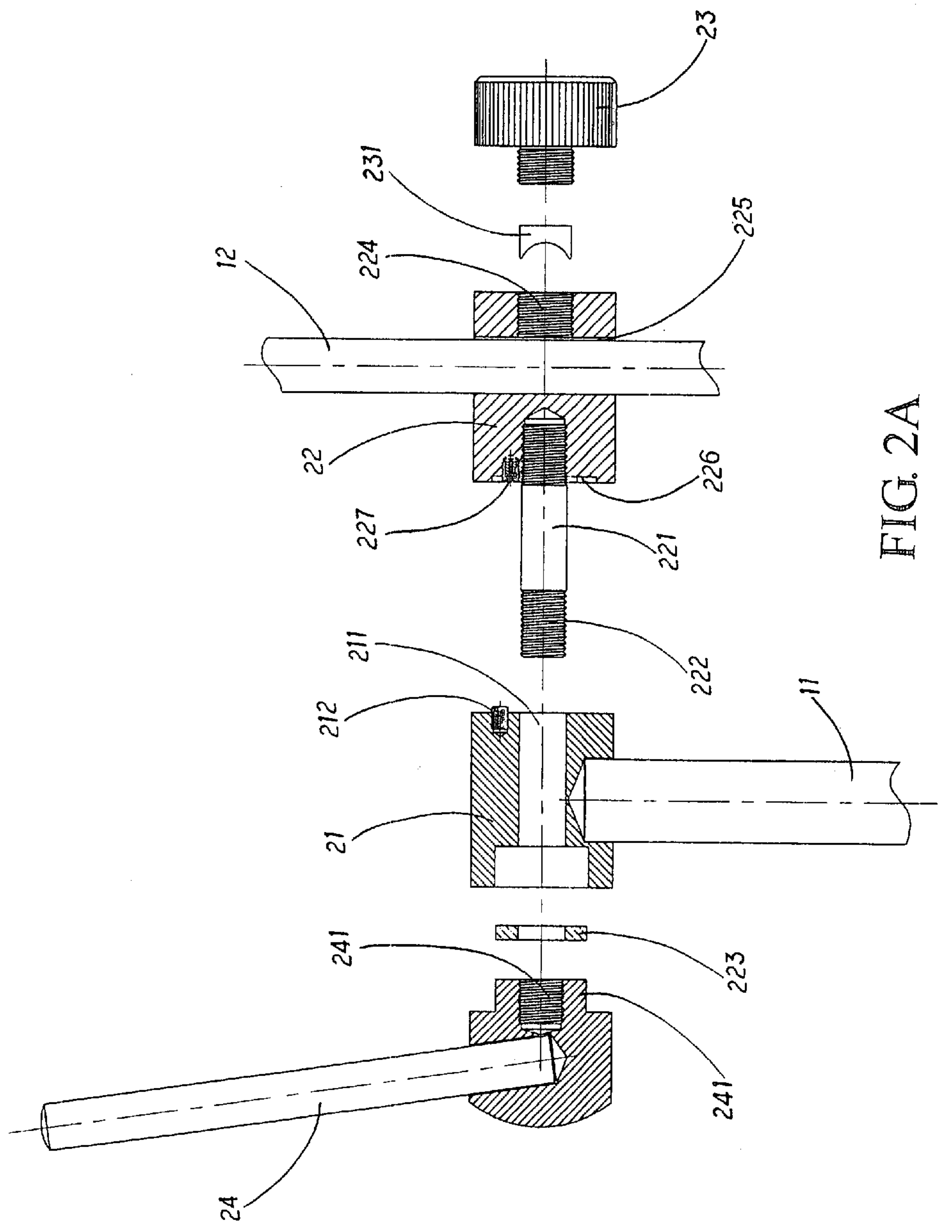
FIG. 2A is a structural cross sectional view about the rotation control device 2 of the present invention.
Figure 2B:
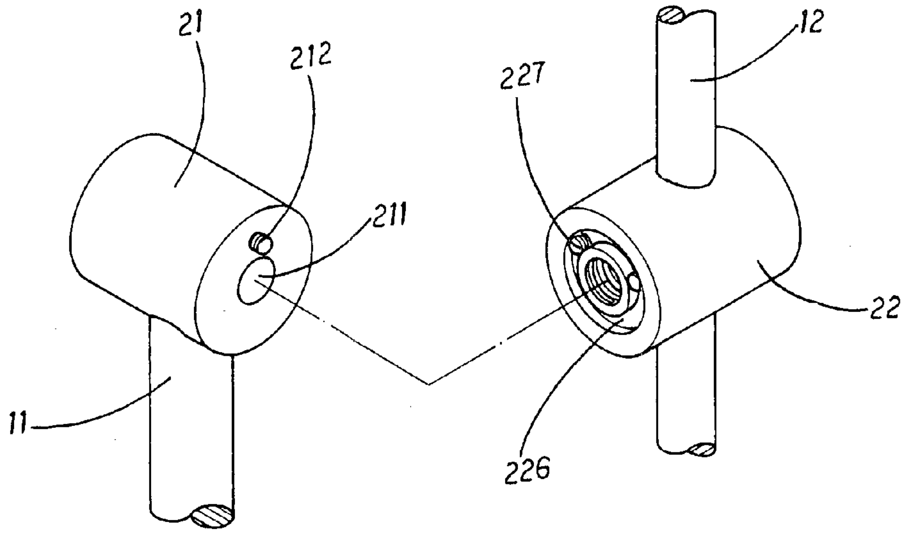
FIG. 2B shows another view of the rotation control device of the present invention.

Referring to FIGS. 2A and 2B, to have a preferred rotation effect, one side of the seat 21 is formed with an annular groove 226. Two posts 27 are installed in the annular groove

226 for confining the rotation extent of the rotation portion 22 with respect to the seat 21.

Figure 2C:
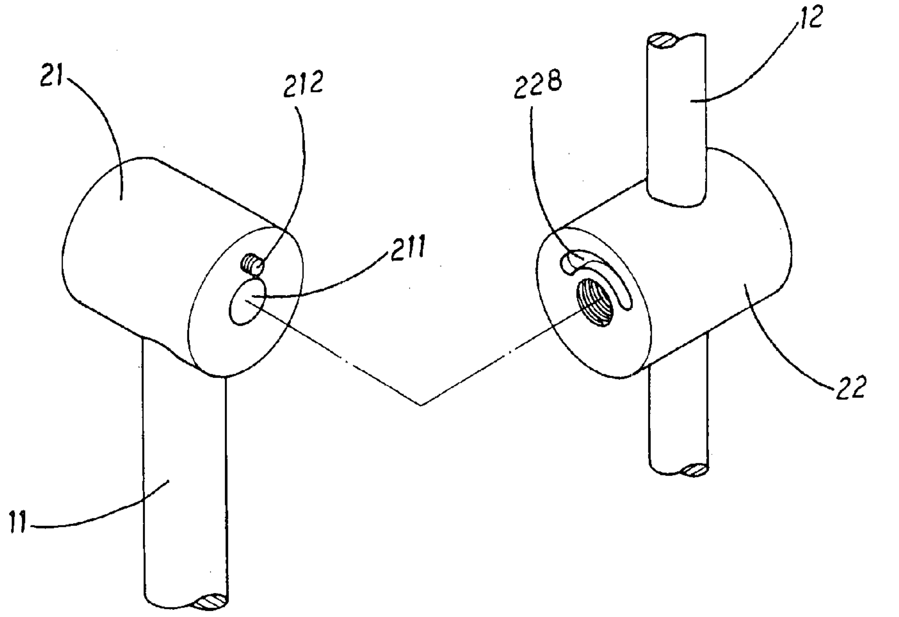
FIG. 2C shows another embodiment of the present invention.
Figure 3:
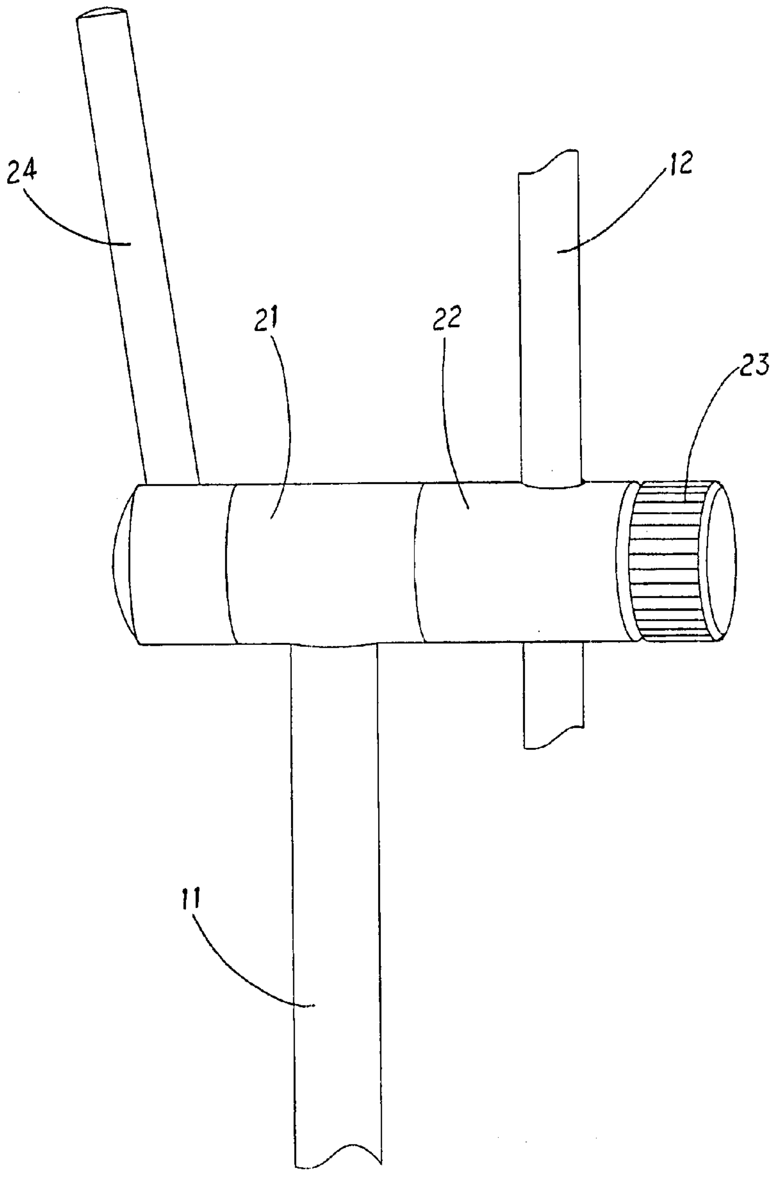
FIG. 3 is an assembled perspective view of rotation control device of the present invention.
Figure 4:
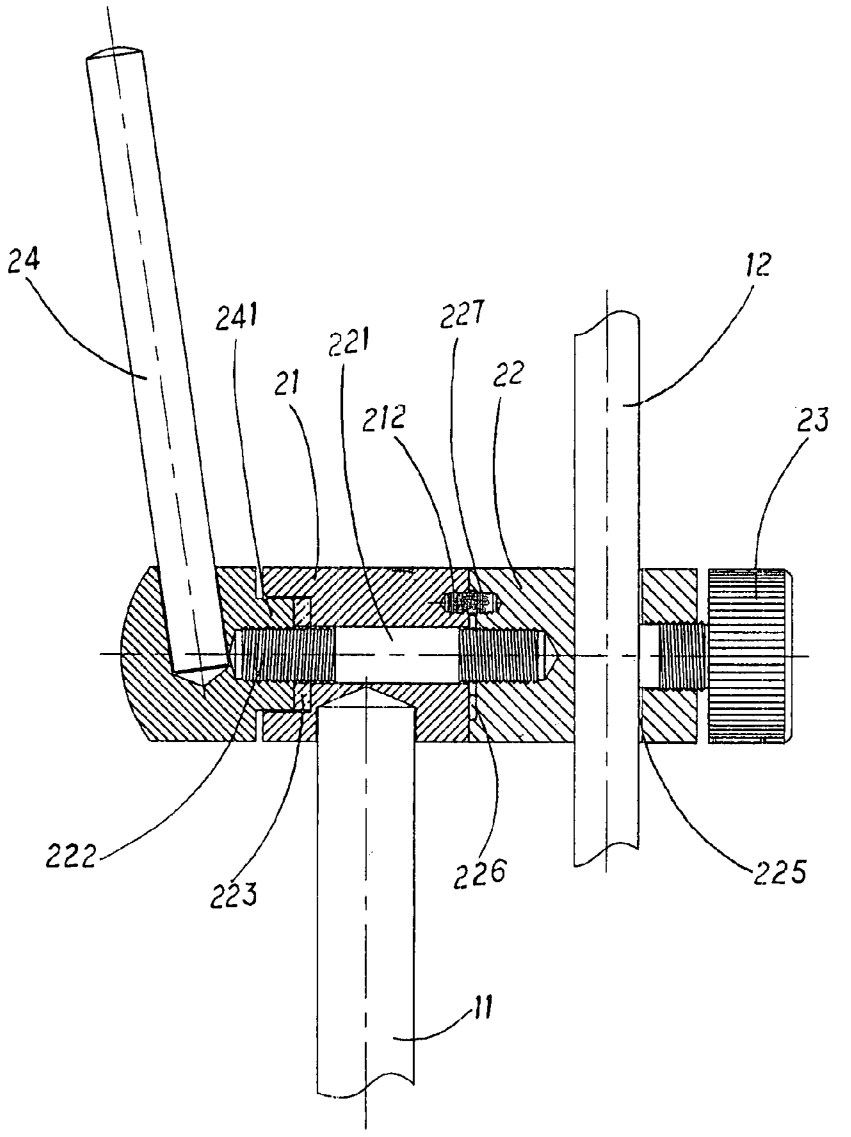
FIG. 4 is an assembled cross sectional view of the rotation control device of the present invention.

Referring to FIG. 2C, another embodiment about the reduced portion 44 of the present invention is illustrated. One side of the seat 21 is installed with a positioning stud 212. An end surface of the rotation portion 22 combining to the seat 21 has a cambered slot 228. The rotation portion 22 is assembled to one side of the seat 21. The positioning stud 212 is inserted into the cambered slot 228. The positioning stud 212 and the cambered slot 228 provide a confinement to the rotate extent of the rotation portion 22 with respect to the seat 21.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An orientation adjustable lamp comprising:

a stand rod extended with a supporting frame;

a rotation control device positioned to the stand rod;

an arm having one end connected to the rotation control device and another end connected to a lamp;

the rotation control device including a seat, a rotation portion, a locking unit and a handle; the seat having an axial hole; the rotation portion being installed at one side of the seat; one end of the rotation portion having a locking stud corresponding to the axial hole of the seat; one end of the locking stud being a threaded section; another end of the rotation portion being installed with a threaded hole for locking the locking unit and a via hole which radially passes through the threaded section for receiving the arm; the handle being installed at another side of the seat; the handle having a threaded hole for locking the locking stud and the threaded section.

2. The orientation adjustable lamp as claimed in claim 1, wherein the stand rod extended with a supporting frame; the seat being fixed to the supporting frame and then being positioned to the stand rod; the rotation control device is combined with the supporting frame so as to be positioned to the stand rod.

3. The orientation adjustable lamp as claimed in claim 1, wherein an end surface of the rotation portion combining to the seat has a cambered slot; the rotation portion is assembled to one side of the seat; the positioning stud is inserted into the cambered slot; the positioning stud and the cambered slot provide a confinement to the rotate extent of the rotation portion with respect to the seat.

4. The orientation adjustable lamp as claimed in claim 1, wherein an end surface of the rotation portion combining to the seat has an annular groove; two posts are installed in the annular groove for confining the rotation extent of the rotation portion with respect to the seat; the rotation portion is assembled to one side of the seat; the positioning stud is inserted into the annular groove to be connected the two posts so as to provide a confinement to the rotate extent of the rotation portion with respect to the seat.

5. The orientation adjustable lamp as claimed in claim 1, wherein a front end of the locking unit having a plug which is received in the threaded hole; the locking unit being screwed into the threaded hole of the rotation portion; a front end of the locking stud pushes the plug to resist against a lateral side of the plug.

6. The orientation adjustable lamp as claimed in claim 1, wherein a washer is coupled to the end of the locking stud; one end of the locking unit is inserted into the axial hole so as to be at one side of the seat.

* * * * *